United States Patent [19]

Speice

[11] Patent Number: 5,352,960
[45] Date of Patent: Oct. 4, 1994

[54] PROGRAMMABLE SPEED SELECTOR FOR A REEVES DRIVE

[75] Inventor: Donald G. Speice, Westerly, R.I.

[73] Assignee: Sparro Machine Products, Inc., Westerly, R.I.

[21] Appl. No.: 16,255

[22] Filed: Feb. 11, 1993

[51] Int. Cl.$^5$ ............................................. G05B 19/29
[52] U.S. Cl. ................................ 318/280; 388/907.5; 388/838
[58] Field of Search ...................... 318/280, 600, 603; 388/907.5, 838

[56] References Cited

U.S. PATENT DOCUMENTS

| | | | |
|---|---|---|---|
| 4,020,406 | 4/1977 | Tokuno et al. | 318/600 |
| 4,933,834 | 6/1990 | Gotou et al. | 318/603 |
| 5,028,854 | 7/1991 | Moline | 388/838 |
| 5,228,077 | 7/1993 | Derbee | 379/102 |

Primary Examiner—William M. Shoop, Jr.
Assistant Examiner—Karen Masih
Attorney, Agent, or Firm—Salter & Michaelson

[57] ABSTRACT

A programmable speed selector is provided for automatically adjusting the speed of a Reeves drive. The speed selector includes an output shaft which attaches to the adjustment crank shaft of the Reeves drive and a reversible motor having a drive shaft for driving the output shaft. Push button switches are provided to selectively energize the motor so that the drive shaft can be manually rotated to a plurality of different rotational positions. A sensing device is provided for sensing the direction and number of revolutions of the drive shaft during positioning thereof and a micro-controller is provided for learning the rotational positions and storing them into selected memory locations. Once programmed, the user may select one of the preset speeds on a key pad and the device will automatically control the motor to position the drive shaft in the desired position thereby automatically adjusting the reeves drive to a desired speed.

14 Claims, 2 Drawing Sheets

PROGRAMMABLE SPEED SELECTOR FOR A REEVES DRIVE

BACKGROUND OF THE INVENTION

The instant invention is related to Reeves type variable speed transmission devices and more particularly to a programmable speed selector therefor.

A Reeves type variable speed transmission unit comprises a pair of split pulleys with a drive belt extending around both pulleys. Speed adjustment of the pulley arrangement is accomplished by means of a worm screw arrangement which is operative for adjusting the distance between the two halves of one of the split pulleys. The worm screw includes a crank shaft which is manually rotatable for adjustment of the spacing of the pulley halves, and the Reeves drive includes a speed indicator for indicating the speed at which the Reeves drive is set. Adjustment of the speed of the Reeves drive is accomplished through manual rotation of the crank shaft and visual inspection the speed indicator to determine when the desired speed is reached. Rotation of the hand crank in a clockwise direction decreases the speed of the drive; and rotation in a counterclockwise direction increases the speed of the drive.

Reeves type transmission units have heretofore been known in the art for providing variable speeds in milling machines and other mechanical machinery. The milling of machine parts often requires the use of several different milling tools each of which requires a different rotational speed of the milling machine, and the Reeves drive enables the milling machine to be readily adjusted to the required speeds. However, it has been found that repeated manual adjustment of the speed of a milling machine is inefficient and inconsistent, thereby causing inconsistent milling results.

Heretofore, motorized speed changing devices for Reeves drives have been known in the art. In particular, Warnke Tool Industries of Oxford, Mich., manufactures such a device which comprises an electric motor that attaches to the crank shaft portion of the worm screw, and a rheostat switch which is operative for controlling rotation of the worm screw in clockwise and counterclockwise directions. Although this device facilitates rotation of the worm screw, it does not provide any means for automatically selecting a desired speed.

The U.S. Pat. No. 3,216,268 to Moser et al also discloses a motorized apparatus for adjusting the speed output of a Reeves type transmission unit. More specifically, the Moser patent discloses a vernier adjustment mechanism for making very fine adjustments of the Reeves drive. The apparatus includes an electric motor which is coupled to the worm screw of the drive through a gear mechanism, and a control unit which is operative for controlling operation of the motor.

Still further, computer numerical control (CNC) systems have been known for programming milling operations and automatically controlling a milling machine according to a set program.

SUMMARY OF THE INVENTION

The instant invention provides a programmable speed selector for a Reeves Drive.

Briefly, the programmable speed selector comprises an output shaft which is attached to the crank shaft portion of the worm screw of the Reeves drive, a reversible motor having a drive shaft for rotating the output shaft, an optical encoder mechanism for measuring the direction of rotation and the number of full and partial revolutions of the drive shaft, and a micro-controller for learning and storing a plurality of rotational positions of the drive shaft. Rotation of the drive shaft causes a corresponding rotation of the crank shaft and a resulting speed adjustment of the Reeves drive. In this regard, each rotational position of the drive shaft corresponds to a speed of the Reeves drive. The programmable speed selector includes push-button switches for selectively energizing the motor and rotating or jogging the drive shaft to adjust the speed of the Reeves drive to a desired speed. The optical encoder mechanism measures the direction of rotation and the number of full or partial revolutions of the drive shaft as the desired speed is adjusted, and then stores the information into a memory location. When a preset speed is selected from the memory, the micro-controller automatically operates the motor to re-position the drive shaft thereby adjusting the speed of the Reeves drive.

Accordingly, it is an object of the instant invention to provide a speed selector for a Reeves drive.

It is another object to provide a speed selector which is programmable with a plurality of preselected speeds.

It is another object to provide a speed selector for a Reeves drive which quickly and consistently adjusts the Reeves drive to a plurality of preselected speeds.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
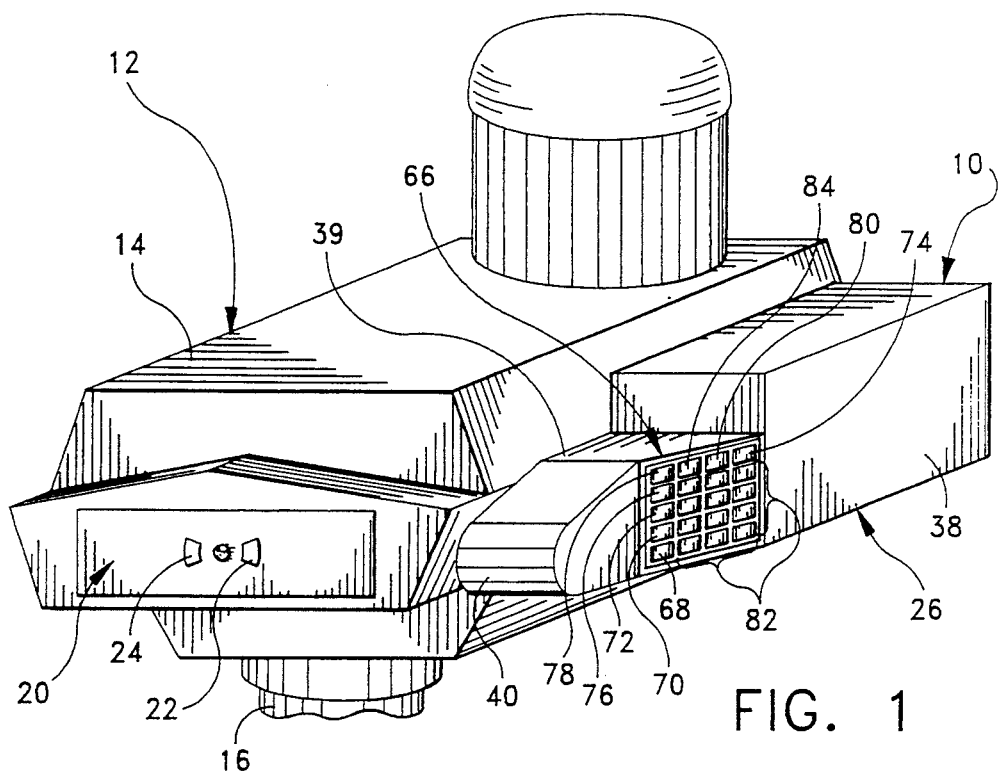
FIG. 1 is a perspective view of a milling machine with the programmable speed selector of the instant invention mounted thereon.
Figure 2:
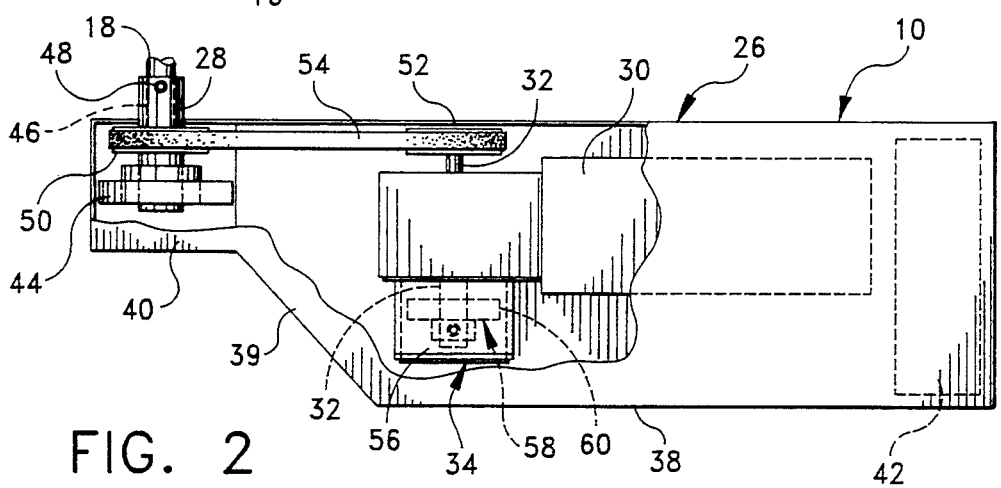
FIG. 2 is a top view of the programmable speed selector with a portion of the housing cut away to show the drive components of the device.
Figure 3:
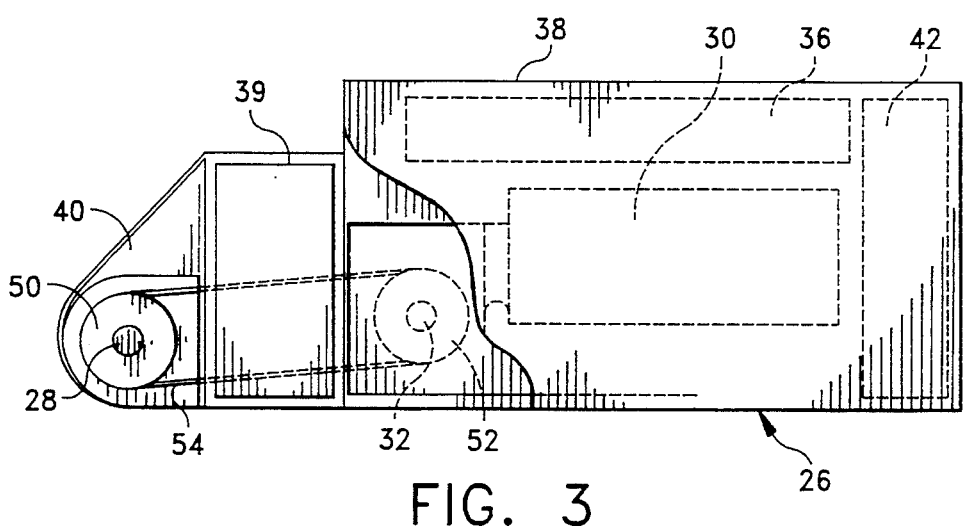
FIG. 3 is a side view thereof with a portion of the housing cut away to show the drive components thereof.
Figure 4:
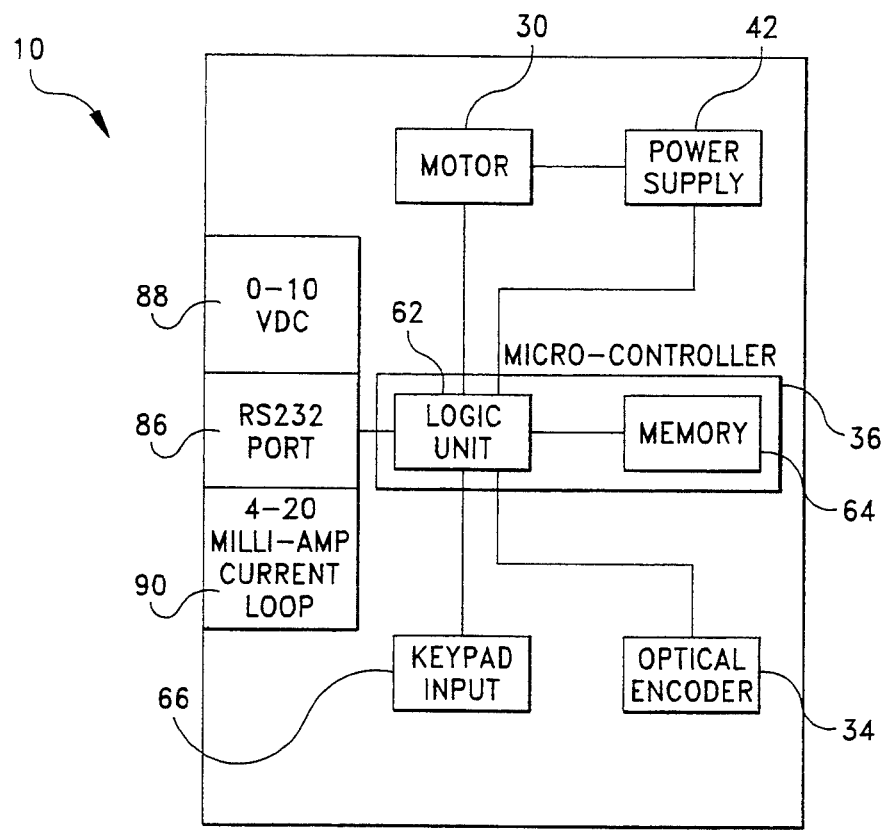
FIG. 4 is a schematic block diagram of the electrical components thereof.
Figure 5:
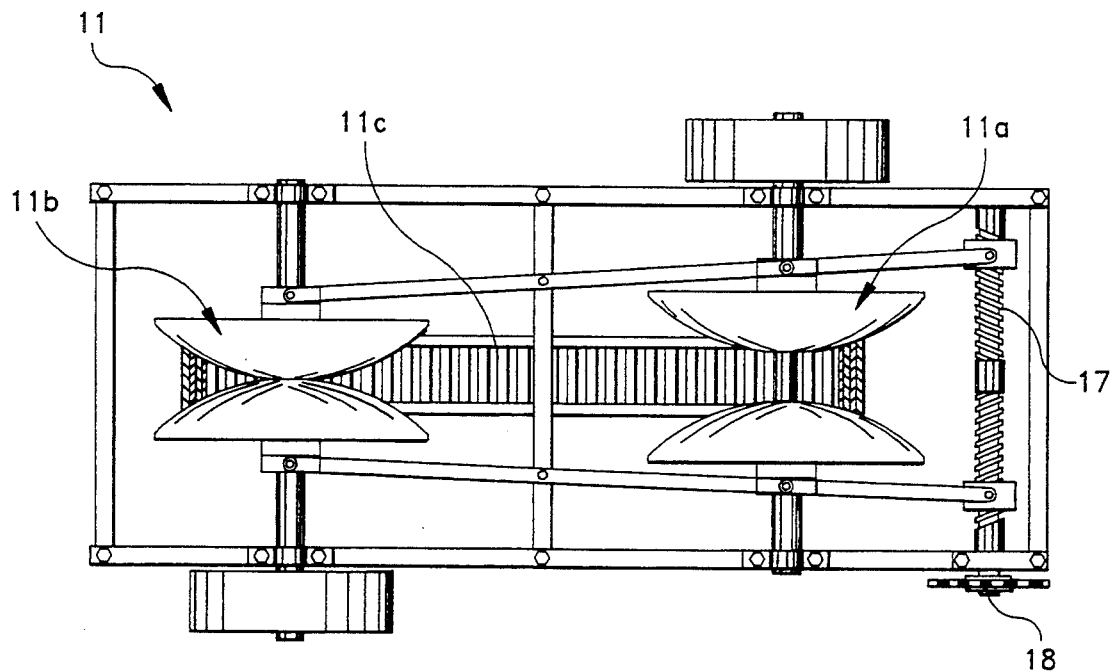
FIG. 5 is a plan view of a Reeve's drive variable speed transmission unit.

Referring now to the drawings, the programmable speed selector of the instant invention is illustrated and generally indicated at 10 in FIGS. 1 through 4. As will be more fully described hereinafter, the programmable speed selector 10 of the instant invention is operative for automatically adjusting a Reeves drive variable speed transmission unit generally indicated at 11 in FIG. 5 to a plurality of pre-selected speeds. In the preferred embodiment, the speed selector of the instant invention 10 is illustrated in combination with a vertical knee type milling machine generally indicated at 12 in FIG. 1, wherein the speed selector 10 is operative for automatically adjusting the rotational speed of the milling machine 12. The milling machine 12 comprises a head portion 14, a spindle 16 rotatably mounted on the head portion 14, and a conventional Reeves drive transmission unit 11 for providing variable speed adjustment of the spindle 16. The Reeves drive 11 comprises a pair of split pulleys, 11a and 11b respectively, a drive belt 11c extending around both pulleys 11a and 11b, and a worm screw 17 for adjusting the distance between the two halves of one of the split pulleys 11a. The worm screw includes a crank shaft portion 18 which is manually rotatable for adjusting the Reeves drive 11. The crank shaft 18 extends outwardly from the head portion 14 of the milling machine 12 to facilitate manual rotation thereof by an operator. In this regard, the milling machine normally includes a crank wheel or handle (not shown) which is received onto the crank shaft 18 to facilitate rotation thereof. The milling machine 12 includes a speed indicator generally indicated at 20 for indicating the speed at which the milling machine 12 is set. The speed indicator 20 includes a low speed range indicator (80–500 RPM) 22 and a high speed range indicator (500–4500 RPM) 24. Speed adjustment of the milling machine 12 is accomplished by selecting a high speed range or low speed range by means of a gear lever (not shown) on the milling machine 12 and manually rotating the crank shaft 18 until the appropriate speed indicator, 22 or 24, reads the speed desired.

The programmable speed selector 10 of the instant invention comprises a housing generally indicated at 26, an output shaft 28 rotatably mounted in the housing 26, a reversible electric motor 30 having a drive shaft 32 for driving the output shaft 28, a sensor device generally indicated at 34 for sensing the direction of rotation and the number of revolutions of the drive shaft 32, and a controller unit 36.

The housing 26 is preferably of one-piece construction, and it is preferably formed from a rigid and durable sheet metal. The housing 26 comprises a body portion 38 which encloses the motor 30, the sensor device 34, and the controller unit 36, an angled neck portion 39, and a head portion 40 which encloses the output shaft 28. The body portion 38 of the housing 26 further encloses a power supply unit 42 for energizing the motor 30 and the controller unit 36. The housing 26 also preferably includes suitable mounting hardware (not shown), such as mounting brackets, for securely mounting the housing 26 to the head 14 of the milling machine 12.

The output shaft 28 is rotatably mounted in a bearing mount 44 in the head portion 40 of the housing 26, and it includes an axial bore (shown in broken lines) 46 which is slidably received over the crank shaft 18 of the Reeves drive. A set screw 48 is provided for fixedly attaching the output shaft 28 to the crank shaft 18, and a conventional pulley wheel 50 is also mounted on the output shaft 28.

The motor 30 preferably comprises a reversible DC (Direct Current) electric motor having a drive shaft 32 which is rotatable in clockwise and counterclockwise directions. A pulley wheel 52 is mounted on a first end of the drive shaft 32, and a toothed belt 54 extends around the pulley wheel 52 on the drive shaft 32 and the pulley wheel 50 on the output shaft 28 to drive the output shaft 28 and crank shaft 18. In this regard, rotation of the drive shaft 32 causes a corresponding equal rotation of the crank shaft 18 and a resulting adjustment in speed of the Reeves drive.

The sensing device 34 comprises a conventional optical encoder unit which is well known in the electrical/optical arts. The optical encoder unit 34 preferably comprises a BEI MOTION SYSTEMS Module No. 90-Q-I Optical Encoder generally indicated at 56, and a BEI MOTION SYSTEMS optical wheel element Model No. 610-I-08 generally indicated at 58 which is mounted on the drive shaft 32 of the motor 30. The optical wheel element 58 has an outer surface 60 and a plurality of alternating dark and light bar-shaped areas (not shown), i.e. similar to bar code on the outer surface 60. In the preferred optical encoder, the wheel element 58 includes 512 bars. The module 56 includes two light emitting diodes (not shown) which are operative for sensing movement of the wheel element 58 as the drive shaft 32 rotates. One of the light emitting diodes is operative for sensing the direction of rotation of the bar-shaped areas (clockwise or counterclockwise) and the other diode is operative for sensing the number of bar-shaped areas which travel past the diode during rotation of the wheel element 58 (512 bars representing a full rotation). In this regard, the sensing device 34 is operative for sensing the direction of rotation and the number off full and partial revolutions of the drive shaft 32 as it is rotated.

The controller unit 36 preferably comprises a conventional micro-controller integrated circuit which includes a logic unit 62 and a memory unit 64. The micro-controller is programmed according to conventional programming techniques and it is electrically interconnected with the optical encoder unit 34. The micro-controller 36 is operative in two modes: a manual mode and an automatic mode. In the manual mode, the micro-controller 34 is operative for learning a plurality of preselected rotational positions of the drive shaft 32 and for storing the preselected rotational positions in selected locations in the memory unit 64. It is pointed out that each rotational position of the drive shaft 32 corresponds to a speed of the Reeves drive. In the automatic mode, the micro-controller 34 is operative for automatically rotating the drive shaft 32 to a plurality of preselected positions, thereby adjusting the milling machine 12 to a plurality of preselected speeds.

The speed selector 10 further includes a pushbutton type keypad generally indicated at 66 (FIG. 1) for inputting information to the micro-controller unit 34. The key pad 66 is mounted on the angled neck portion 39 of the housing 26, and it preferably comprises a membrane type keypad, or a dome and conductive rubber keypad, both of which are capable of withstanding continuous exposure to oily and dusty environments. The keypad 66 includes a manual/automatic mode button 68 and two momentary pushbutton switches 70 and 72 respectively, which are operative for selectively energizing the motor 30 for rotation of the drive shaft 32. One of the momentary switches 70 is operative for rotation of the drive shaft 32 in a clockwise direction to decrease the speed of the Reeves drive, and the other momentary switch 72 is operative for rotation of the drive shaft 32 in a counterclockwise direction to increase the speed. In this regard, the push-button switches 70 and 72, are operative for manually adjusting the Reeves drive to a plurality of preselected speeds. To adjust the speed of the Reeves drive using the manual switches 70 and 72, the operator selects the manual mode using the manual/automatic mode button 68, depresses one of the momentary switches 70 or 72, until the desired speed is indicated on the speed indicator 22, and then releases the switch. The keypad 66 further includes a program button 74, a low speed set button 76, a high speed set button 78, a low speed range reminder button 80, twelve numerical speed set buttons 82 for setting and selecting the desired speeds, and a clear button 84 for clearing the memory locations. Each of the numbered speed buttons 82 represents an individual speed setting. The electrical circuitry interconnecting the electrical components of the speed selector is conventional in the electrical arts, and therefore it is shown only schematically in FIG. 4. The keypad 66 may also comprise a plurality of LED indicators for indicating various operating modes of the device, such as for indicating whether the speed selector 10 is in the manual mode or automatic mode.

To program the speed selector 10, an operator selects the manual mode and then manually operates or jogs the motor 30 via the momentary switches 70 and 72, until a desired minimum speed is indicated on the speed indicator 22. This minimum speed represents the lowest speed at which the operator desires the milling machine 12 to operate. After jogging the machine 12 to the lowest speed, the operator presses the low speed set button 76 to store the speed into memory. The low speed setting represents a datum or reference point from which all other rotational positions of the drive shaft 32 are measured. Thereafter, when the drive shaft 32 is manually rotated to other desired speeds, the optical encoder unit 34 senses the direction of rotation of the drive shaft 32 and the number of revolutions away from the datum point by sensing the direction of rotation of the bars and the number of bars which rotate past the counting diode. This information (direction of rotation and number of bars) is fed to the micro-controller 36 which is operative for monitoring the present position of the drive shaft 32 with respect to the datum point, and for learning and storing the specific rotational positions into memory. The highest operational speed of the milling machine 12 is programmed in a similar manner using the high speed set button 78.

To program a preselected speed for automatic operation, the operator again selects the manual mode and uses the momentary jogging switches 70 and 72 to adjust the desired speed setting of the Reeves drive. When the desired speed is indicated, the operator presses the program button 74, and one of the number buttons 82 to store the desired speed setting into a memory location. It is again pointed out that the micro-controller 36 senses the present rotational position of the drive shaft 32 with respect to the datum position by sensing the direction of rotation of the bars and the number of bars which rotate past the counting diode. The micro-controller 36 then stores the information into a memory location corresponding to the number button 82. In this manner, the speed selector is operative for storing 12 preselected speed settings. While there are 12 preselected speed settings in the instant embodiment, it is to be understood that the speed selector can be easily adapted to store a greater or lesser number of preset speeds. Each time a desired speed is set, the micro-controller 36 measures the present rotational position of the drive shaft 32 with respect to the datum position, and stores the information into memory.

To automatically adjust the milling machine 12 to a preset speed, the operator first depresses the automatic/manual mode button 68 to select the automatic mode, and then depresses the number button 82 corresponding to the desired speed, for example, speed button number 4. If speed number 4 is in the low speed range, the operator should also depress the low speed range reminder button 80. In this regard, the low speed range reminder button 80 is operative for illuminating one of the LED indicators. The illuminated LED acts as a reminder for the operator to adjust the high/low speed gear lever to the correct position. The micro-controller 36 senses the present rotational position of the drive shaft 32 and compares it to the rotational position stored in low speed range memory location number 4. The micro-controller 36 then calculates the proper direction of rotation and the number of revolutions of the drive shaft 32, i.e. the number of bars, required to reach the desired rotational position (speed setting), and then automatically operates the motor 30 to rotate the drive shaft 32 the required number of revolutions. It is again pointed out that the high speed/low speed gear lever (not shown) must be adjusted to the correct position by the operator for the milling machine 12 to operate at the desired speed.

To clear any one of the preset speeds, the operator depresses the clear button 84 and the setting button which it is desired to clear. For example, to clear the high speed setting, the operator depresses the "clear" button 84 and then depresses high speed set button 78.

The programmable speed selector 10 also preferably includes an RS 232 communication port 86, a 0–10 V DC port 88, and a 4–20 milli-amp current loop port 90 (FIG. 4) for communicating with computer numerical control (CNC) systems. The plurality of communication ports enable the speed selector to communicate with any one of the currently available CNC systems. In this manner of operation, the CNC system sends command signals to the speed selector via one of the communication ports to automatically select a desired speed setting from the speed selector's memory 64 and to operate the motor 30.

It is seen therefore, that the instant invention provides an effective programmable speed selector 10 for a Reeves drive variable speed transmission device. The speed selector 10 is operative for learning and storing a plurality of preselected speeds and for automatically adjusting the Reeves drive to the preselected speeds. The speed selector is simple to program and operate, and it effectively eliminates the inefficient and inconsistent manual adjustment of speeds in milling machines that were previously required. It is pointed out that the programmable speed selector 10 is universally adaptable to any article of mechanical machinery which employs a Reeves drive device having a manual hand crank. For these reasons, the speed selector of the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A programmable speed selector for a Reeves type variable speed transmission unit having a worm screw which is rotatable in clockwise and counterclockwise directions for adjusting a speed setting thereof, said programmable speed selector comprising:

reversible motor means having a drive shaft which is operable for clockwise and counterclockwise rotation, said drive shaft being coupled to said worm screw for rotation thereof;

power means for energizing said motor means;

means for selectively energizing said motor means for clockwise or counterclockwise rotation of said drive shaft to a plurality of preselected rotational positions, said preselected rotational positions corresponding to a plurality of preselected speed settings of said reeves type transmission unit;

means for sensing said rotational positions of said drive shaft, said sensing means sensing a direction of rotation of said drive shaft and a number of full or partial revolutions of said drive shaft with respect to a datum rotational position;

memory means for storing said plurality of rotational positions;

input means for inputting said rotational positions to said memory means and for selecting one of said stored rotational positions from said memory means; and controller means for controlling said motor means to automatically rotate said drive shaft to said selected rotational position in response to said input means, thereby selecting a speed of said reeves type transmission unit.

2. In the programmable speed selector of claim 1, said sensing means comprising an optical encoder, said optical encoder comprising an optical wheel element mounted to said drive shaft and at least two sensing diodes positioned around the circumference of the optical wheel element, said optical wheel element including alternating dark and light stripes on the circumference thereof, one of said diodes being operative for sensing direction of rotation of said stripes, and the other of said diodes being operable for sensing a number stripe rotations.

3. The programmable speed selector of claim 1, further comprising:

housing means;

an output shaft rotatably mounted in said housing means;

means for attaching said output shaft to said worm screw; and means for coupling said drive shaft to said output shaft for rotation thereof.

4. In the programmable speed selector of claim 3, said means for coupling comprising:

first pulley means on said output shaft;

second pulley means on said drive shaft; and belt means extending around said first and second pulley means.

5. In the programmable speed selector of claim 1, said means for selectively energizing said motor means comprising momentary switches.

6. In the programmable speed selector of claim 1, said controller means comprising micro-controller circuit means.

7. The programmable speed selector of claim 1 further comprising means for communicating with a computer numerical control system.

8. In the programmable speed selector of claim 7, said means for communicating comprising an RS 232 communication port.

9. A programmable speed selector for a Reeves type variable speed transmission unit having a worm screw which is rotatable in clockwise and counterclockwise directions for adjusting a speed setting thereof, said programmable speed selector comprising:

a housing;

an output shaft rotatably mounted in said housing;

means for attaching said output shaft to said worm screw;

reversible motor means having a drive shaft which is operable for clockwise and counterclockwise rotation, said drive shaft being coupled to said output shaft for rotation of said worm screw;

power means for energizing said motor means;

momentary switch means for selectively energizing said motor means for clockwise or counterclockwise rotation of said drive shaft to a plurality of preselected rotational positions, said preselected rotational positions corresponding to a plurality of preselected speed settings of said reeves type transmission unit;

optical encoder means for sensing said rotational positions of said drive shaft, said sensing means sensing a direction of rotation of said drive shaft and a number of full or partial revolutions of said drive shaft with respect to a datum rotational position;

memory means for storing said plurality of rotational positions;

input means for inputting said rotational positions to said memory means and for selecting one of said stored rotational positions from said memory means; and controller means for controlling said motor means to automatically rotate said drive shaft and said coupled worm screw to said selected rotational position in response to said input means, thereby selecting a speed of said reeves type transmission unit.

10. In the programmable speed selector of claim 9, said controller means comprising micro-controller circuit means.

11. The programmable speed selector of claim 9 further comprising means for communicating with a computer numerical control system.

12. In the programmable speed selector of claim 11, said means for communicating comprising an RS 232 communication port.

13. In the programmable speed selector of claim 11, said means for communicating comprising a 0–10 V DC communication port.

14. In the programmable speed selector of claim 11 comprising a 4–20 milli-amp current loop communication port.

* * * * *